US009423671B2

(12) United States Patent
O'Neill et al.

(10) Patent No.: US 9,423,671 B2
(45) Date of Patent: Aug. 23, 2016

(54) ACCESSORIES FOR COMMUNICATION DEVICES

(71) Applicant: olloclip, LLC, Huntington Beach, CA (US)

(72) Inventors: Patrick D. O'Neill, Huntington Beach, CA (US); Chong Pak, Lakewood, CA (US); Ryan Nguyen, Fountain Valley, CA (US)

(73) Assignee: olloclip, LLC, Huntington Beach, CA (US)

( * ) Notice: Subject to any disclaimer, the term of this patent is extended or adjusted under 35 U.S.C. 154(b) by 0 days.

(21) Appl. No.: 14/180,320

(22) Filed: Feb. 13, 2014

(65) Prior Publication Data

US 2014/0227026 A1    Aug. 14, 2014

Related U.S. Application Data

(60) Provisional application No. 61/764,981, filed on Feb. 14, 2013, provisional application No. 61/936,824, filed on Feb. 6, 2014.

(51) Int. Cl.
*B25G 3/18* (2006.01)
*F16B 21/00* (2006.01)
(Continued)

(52) U.S. Cl.
CPC .............. *G03B 15/06* (2013.01); *F16B 17/00* (2013.01); *G03B 17/08* (2013.01); *G03B 17/565* (2013.01);
(Continued)

(58) Field of Classification Search
CPC ............. Y10T 403/59; Y10T 403/591; Y10T 403/593; Y10T 403/595; Y10T 403/597; H04M 1/0264; H04M 1/0279; H04M 1/0208; H04M 1/0225; H04M 1/185; G06F 1/1626; G06F 1/1689; G06F 2200/1633; G03B 15/06; G03B 17/00; G03B 17/08; G03B 17/565

USPC ................ 403/321, 322.1, 322.3, 322.4, 323
See application file for complete search history.

(56) References Cited

U.S. PATENT DOCUMENTS 3,140,905 A * 7/1964 Trotter .................. A47B 95/02
312/332.1
3,575,482 A * 4/1971 MacMaster .......... H05K 7/1411
312/332.1
(Continued)

FOREIGN PATENT DOCUMENTS

CN            2694645       4/2005
WO     WO 2013/103845      7/2013
(Continued)

OTHER PUBLICATIONS

International Search Report and Written Opinion in PCT Application No. PCT/US2013/020320 dated Mar. 26, 2013.
(Continued)

*Primary Examiner* — Gregory Binda
*Assistant Examiner* — Nahid Amiri
(74) *Attorney, Agent, or Firm* — Knobbe, Martens, Olson & Bear, LLP

(57) ABSTRACT

A modular accessory adapter configured to be selectively attachable to at least one of a communication device and a case for a communication device. The modular accessory adapter includes a first member configured to be rotatably coupled to a second member such that the first member is rotatable relative to the second member to move the modular accessory adapter between a first position and a second position. The modular accessory adapter further includes a mount for attaching at least one of a flash, tripod, battery, diffuser, microphone, and speaker. The modular accessory adapter includes an engagement member configured to engage with a portion of at least one of a communication device and a case for a communication device. In the first position, the modular accessory adapter is configured to be removably attachable to the at least one of a communication device and a case for a communication device.

9 Claims, 5 Drawing Sheets

(51) Int. Cl.
*F16D 1/00* (2006.01)
*G03B 15/06* (2006.01)
*F16B 17/00* (2006.01)
*G03B 17/08* (2006.01)
*G03B 17/56* (2006.01)
*H04B 1/3888* (2015.01)
*G06F 1/16* (2006.01)
*H04M 1/02* (2006.01)
*H04M 1/18* (2006.01)

(52) U.S. Cl.
CPC ........... *G06F 1/1626* (2013.01); *G06F 1/1686* (2013.01); *H04B 1/3888* (2013.01); *G06F 2200/1633* (2013.01); *H04M 1/0264* (2013.01); *H04M 1/185* (2013.01); *Y10T 29/49826* (2015.01); *Y10T 403/595* (2015.01); *Y10T 403/70* (2015.01)

(56) References Cited

U.S. PATENT DOCUMENTS

| | | | |
|---|---|---|---|
| 4,420,078 A | 12/1983 | Belt et al. | |
| 4,972,306 A | 11/1990 | Bornhorst | |
| 5,070,407 A | 12/1991 | Wheeler et al. | |
| 5,541,686 A | 7/1996 | Stephenson | |
| 5,907,721 A | 5/1999 | Schelling | |
| 6,325,353 B1 | 12/2001 | Jiang | |
| 6,356,441 B1* | 3/2002 | Claprood | G06F 1/184 312/332.1 |
| D565,290 S | 4/2008 | Brandenburg et al. | |
| 7,847,860 B2 | 12/2010 | Kim | |
| 8,023,263 B2* | 9/2011 | Crippen | G06F 1/187 312/223.1 |
| 8,068,332 B2 | 11/2011 | Yang et al. | |
| 8,073,324 B2 | 12/2011 | Tsai | |
| D663,263 S | 7/2012 | Gupta et al. | |
| 8,226,306 B2 | 7/2012 | Chou | |
| 8,279,544 B1 | 10/2012 | O'Neill | |
| D676,432 S | 2/2013 | Hasbrook et al. | |
| D677,250 S | 3/2013 | Takamoto | |
| D679,695 S | 4/2013 | Fahrendorff et al. | |
| D684,567 S | 6/2013 | Murchison et al. | |
| 8,640,867 B2 | 2/2014 | Szucs et al. | |
| D706,271 S | 6/2014 | Gelsomini et al. | |
| 8,760,569 B2 | 6/2014 | Yang | |
| D709,439 S | 7/2014 | Ferber et al. | |
| D709,485 S | 7/2014 | Bishop | |
| D714,275 S | 9/2014 | Tompkin | |
| 8,891,187 B2 | 11/2014 | O'Neill | |
| D740,268 S | 10/2015 | O'Neill et al. | |
| 9,195,023 B2 | 11/2015 | O'Neill et al. | |
| 9,294,660 B2 | 3/2016 | O'Neill et al. | |
| 2002/0160724 A1 | 10/2002 | Arai et al. | |
| 2003/0122957 A1 | 7/2003 | Emme | |
| 2005/0245295 A1 | 11/2005 | Lee et al. | |
| 2007/0216796 A1 | 9/2007 | Lenel et al. | |
| 2007/0241012 A1 | 10/2007 | Latchford et al. | |
| 2007/0261978 A1 | 11/2007 | Sanderson | |
| 2007/0280677 A1 | 12/2007 | Drake et al. | |
| 2008/0094786 A1 | 4/2008 | Liou et al. | |
| 2008/0273112 A1 | 11/2008 | Sladen | |
| 2009/0109325 A1 | 4/2009 | Imai et al. | |
| 2009/0109558 A1 | 4/2009 | Schaefer | |
| 2009/0181729 A1 | 7/2009 | Griffin, Jr. et al. | |
| 2009/0203398 A1 | 8/2009 | Griffin | |
| 2009/0237812 A1 | 9/2009 | Tseng et al. | |
| 2010/0065454 A1 | 3/2010 | Badillo et al. | |
| 2010/0200456 A1 | 8/2010 | Parkinson | |
| 2011/0009174 A1 | 1/2011 | Ladouceur et al. | |
| 2011/0073505 A1 | 3/2011 | Stiehl | |
| 2011/0097070 A1 | 4/2011 | Kurokawa et al. | |
| 2011/0272305 A1 | 11/2011 | Lee | |
| 2011/0286199 A1 | 11/2011 | Miikkola et al. | |
| 2011/0309728 A1 | 12/2011 | Diebel | |
| 2012/0236424 A1 | 9/2012 | Yang | |
| 2012/0257008 A1 | 10/2012 | Taylor | |
| 2012/0321294 A1 | 12/2012 | Tages et al. | |
| 2013/0028591 A1 | 1/2013 | Hicks | |
| 2013/0063004 A1 | 3/2013 | Lai et al. | |
| 2013/0069499 A1 | 3/2013 | Modrell | |
| 2013/0121677 A1 | 5/2013 | Yeh et al. | |
| 2013/0127309 A1 | 5/2013 | Wyner et al. | |
| 2013/0135871 A1 | 5/2013 | Harooni | |
| 2013/0177304 A1 | 7/2013 | Chapman et al. | |
| 2013/0206614 A1* | 8/2013 | O'Neill | H04B 1/3888 206/216 |
| 2013/0240578 A1 | 9/2013 | Yu | |
| 2013/0329115 A1 | 12/2013 | Palmeri | |
| 2013/0335315 A1 | 12/2013 | Bonnat | |
| 2014/0063049 A1 | 3/2014 | Armstrong-Muntner | |
| 2014/0132781 A1 | 5/2014 | Adams et al. | |
| 2014/0171150 A1 | 6/2014 | Hurst et al. | |
| 2014/0226268 A1 | 8/2014 | O'Neill et al. | |
| 2014/0226300 A1 | 8/2014 | O'Neill et al. | |
| 2014/0263939 A1 | 9/2014 | Rinner | |
| 2014/0268376 A1 | 9/2014 | O'Neill et al. | |
| 2014/0268516 A1 | 9/2014 | Fathollahi et al. | |
| 2014/0360893 A1 | 12/2014 | Whitten et al. | |
| 2015/0002950 A1 | 1/2015 | O'Neill et al. | |
| 2015/0156898 A1 | 6/2015 | Shin et al. | |
| 2015/0172522 A1 | 6/2015 | O'Neill et al. | |
| 2015/0177147 A1 | 6/2015 | Mangan et al. | |
| 2015/0180527 A1 | 6/2015 | Fathollahi | |
| 2015/0222315 A1 | 8/2015 | O'Neill et al. | |

FOREIGN PATENT DOCUMENTS

| | | |
|---|---|---|
| WO | WO 2014/043266 | 3/2014 |
| WO | WO 2015/119882 | 8/2015 |

OTHER PUBLICATIONS

U.S. Appl. No. 29/4414,469, filed Jan. 4, 2013, O'Neill et al.
Gizmon, "Gizmon Smart Clip", as archived Jan. 28, 2016 in 3 pages, http://web.archive.org/web/20160128231755/http://gizmon.com/gizmon-smartclip/.
U.S. Appl. No. 14/606,500, Jan. 27, 2015, O'Neill et al.
U.S. Appl. No. 15/076,465, Mar. 21, 2016, Unassigned.

* cited by examiner

ACCESSORIES FOR COMMUNICATION DEVICES

CROSS-REFERENCE TO RELATED APPLICATIONS

This application claims the benefit of U.S. Provisional Application No. 61/764,918, filed Feb. 14, 2013, and U.S. Provisional Application No. 61/936,824, filed Feb. 6, 2014, the entireties of both of which are incorporated herein by reference.

BACKGROUND

1. Field of the Inventions

This invention relates generally to cases and other accessories, and specifically to cases and other accessories for communication devices (e.g., mobile telephones, mobile texting devices, electronic pad devices, laptop computers, desktop computers, gaming devices, and/or devices capable of linking electronically to another device or to a network such as the Internet, etc.)

2. Description of the Related Art

In recent years, many advances in computer networking and processing technology have made it possible for communication devices to include cameras that permit users to capture images. In many cases, these images can be stored, processed, and transmitted. However, there are many design constraints on onboard cameras in communication devices that can limit the weight, size, expense, shape, adjustability, and overall quality of the lensing systems of such cameras. Consequently, many cameras in communications devices are inadequate for a wide variety of photographic needs and may produce poor quality photographic images.

The deficiencies of onboard camera lenses can be addressed by modular or detachable lensing systems. Such lensing systems may be mounted or attached to communication devices such that one or more auxiliary lenses are positioned substantially over the onboard camera lenses of the communication devices. The auxiliary lenses can enhance or alter the light that may be captured by the onboard cameras to generate an image.

Other accessories may be used with communication devices, such as protective cases. A case is intended to provide protection for the communication device, and inhibit wear and/or damage to the communication device. Conventionally, protective cases cover the exterior of the communication device, or some portion thereof, to cushion impacts, protect against scratches, and the like.

SUMMARY

In certain embodiments, a modular accessory adapter is provide that is configured to be removably attachable to at least one of a communication device and a case for a communication device. The adapter comprises a first member configured to be rotatably coupled to a second member such that the first member is rotatable relative to the second member to move the modular accessory adapter between a first position and a second position. The adapter comprises a mount for attaching at least one of a flash, tripod, battery, diffuser, microphone, and speaker. The adapter comprises an engagement member configured to engage with a portion of at least one of a communication device and a case for a communication device. In the first position, the modular accessory adapter is configured to be removably attachable to the at least one of a communication device and a case for a communication device.

In some embodiments, the first member is configured to be rotatably coupled to the second member at a first pivot at a first end of the second member and a third member is configured to be rotatably coupled to the second member at a second pivot at a second end of the second member such that both the first and third members are rotatable relative to the second member about first and second vertical axes extending generally transverse to a lateral axis of the second member to move the modular accessory adapter between the first position and the second position.

In some embodiments, the first position comprises an unfolded position of the first and third members configured for attaching and removing the modular accessory adapter to and from the at least one of a communication device and a case for a communication device such that the first and third members extend parallel to each other in a direction generally transverse to the lateral axis of the second member, the first axis, and the second axis, and wherein the second position comprises a folded, low-profile position of the first and third members such that the first and third members extend parallel to each other in a direction generally parallel to the lateral axis of the second member and generally transverse to the first and second axes.

In some embodiments, the second axis of the second pivot is configured to be positioned at a greater distance from the lateral axis of the second member than the first axis of the first pivot in the direction generally transverse to the lateral axis of the second member, the vertical first axis, and the vertical second axis such that the third member is configured to fold over the first member and to overlap the first member in a generally horizontal plane when the modular accessory adapter is in the second position.

In some embodiments, the engagement member comprises a channel formed between top and bottom flanges of the first member, wherein the channel is configured to slidably receive a side portion of the at least one of a communication device and a case for a communication device when the modular accessory adapter is attached to the at least one of a communication device and a case for a communication device in the first position.

In some embodiments, the first member comprises an elongate member configured to extend within an interior of the second member and a third member and comprises a knob configured to be rotated by a user to disengage the elongate member from a retainer portion of the second member to extend the second member away from the third member and move the modular accessory adapter from the second position to the first position, wherein the modular accessory adapter is configured to be secured to the at least one of a communication device and a case for a communication device in the second position.

In some embodiments, the knob is configured to be accessible to the user for rotating the elongate member through an opening in the third member and wherein the second and third members comprise first and second engagement members configured to secure the modular accessory adapter to the at least one of a communication device and a case for a communication device in the second position.

In some embodiments, the knob is configured to extend outwardly away from an exterior side of the third member to be accessible to the user for rotating the elongate member and wherein the second and third members comprise first and second engagement members configured to secure the modular accessory adapter to the at least one of a communication device and a case for a communication device in the second position.

In certain embodiments, the knob is configured to extend outwardly away from an exterior side of the third member at an oblique angle relative to a lateral axis of the third member to be accessible to the user for rotating the elongate member.

In some embodiments, the first and second engagement members are configured to secure the modular accessory adapter to two or more sides of the at least one of a communication device and a case for a communication device in the second position.

According to certain embodiments, herein, the first member comprises a lever rotatably coupled to the second member at a pivot such that the lever is movable between an open position and a closed position corresponding to the first and second positions of the modular accessory adapter. The lever and second member comprise first and second engagement members, respectively, and are configured to allow the modular accessory adapter to be installed to and removed from the at least one of a communication device and a case for a communication device when the lever is in the open position and configured to secure the modular accessory adapter to the at least one of a communication device and a case for a communication device when the lever is in the closed position.

In some embodiments, the lever comprises a channel formed between top and bottom flanges, wherein the channel is configured to receive a portion of the second member when the lever is in the closed position such that posterior surfaces of the lever and second member are in generally planar alignment.

In some embodiments, the lever comprises a first aperture configured to be aligned with a second aperture of the second member when the lever is in the closed position. The aligned first and second apertures are configured to receive an elongate connecting member configured to simultaneously secure the modular accessory adapter to the at least one of a communication device and a case for a communication device and the lever to the second member in the second position.

In some embodiments, the elongate connecting member comprises a tripod screw.

In some embodiments, the first member comprises a lever rotatably coupled to the second member configured to rotate between an open position and a closed position corresponding to the first and second positions of the modular accessory adapter, wherein the modular accessory adapter is configured to be secured to the at least one of a communication device and a case for a communication device in the second position and wherein a width of the modular accessory adapter in a lateral direction is increased relative to the width in the closed position when the lever is rotated to the open position and wherein the width of the modular accessory adapter is decreased relative to the open position when the lever is rotated to the closed position.

In some embodiments, the lever is rotatably coupled to the second member by an adjustment component, the adjustment component configured to adjust a tension of the lever and amount of force require to rotate the lever between the open position and the closed position.

In some embodiments, the second member is configured to move at least partially out of a third member when the lever is rotated to the open position and wherein the second member is configured to move at least partially into the third member when the lever is rotated to the closed position.

In some embodiments, the lever is rotatably coupled to the second member at a pivot and wherein the second member is configured to move away from a third member in the lateral direction when the lever is rotated to the open position and wherein the second member is configured to move towards the third member in the lateral direction when the lever is rotated to the closed position.

In some embodiments, the lever comprises a handle on a first end of the lever and a head portion on a second end of the lever opposite the first end, wherein the head portion is configured to engage first and second opposing medial surfaces of the second and third members, respectively, and push the first and second opposing medial surfaces in opposite lateral directions as the lever is rotated to the open position to increase the width of the modular accessory adapter in the lateral direction and wherein the head portion is configured to disengage from the first and second opposing medial surfaces as the lever is rotated to the closed position allowing the second member and third member to move towards each other in a medial direction such that the width of the modular accessory adapter in the lateral direction is decreased.

In some embodiments, the adapter includes a biasing mechanism configured to bias the lever to the closed position when a user releases the lever from the open position.

BRIEF DESCRIPTION OF THE DRAWINGS

Embodiments of various inventive features will now be described with reference to the following drawings. Certain comments and descriptions are provided in the drawings by way of examples, but should not be understood to limit the scope of the inventions or to provide the only possible application, structure, or usage for the illustrated example. Throughout the drawings, reference numbers may be re-used to indicate correspondence between referenced elements. The drawings are provided to illustrate example embodiments described herein and are not intended to limit the scope of the disclosure.

DETAILED DESCRIPTION OF EMBODIMENTS

Figure 1A:
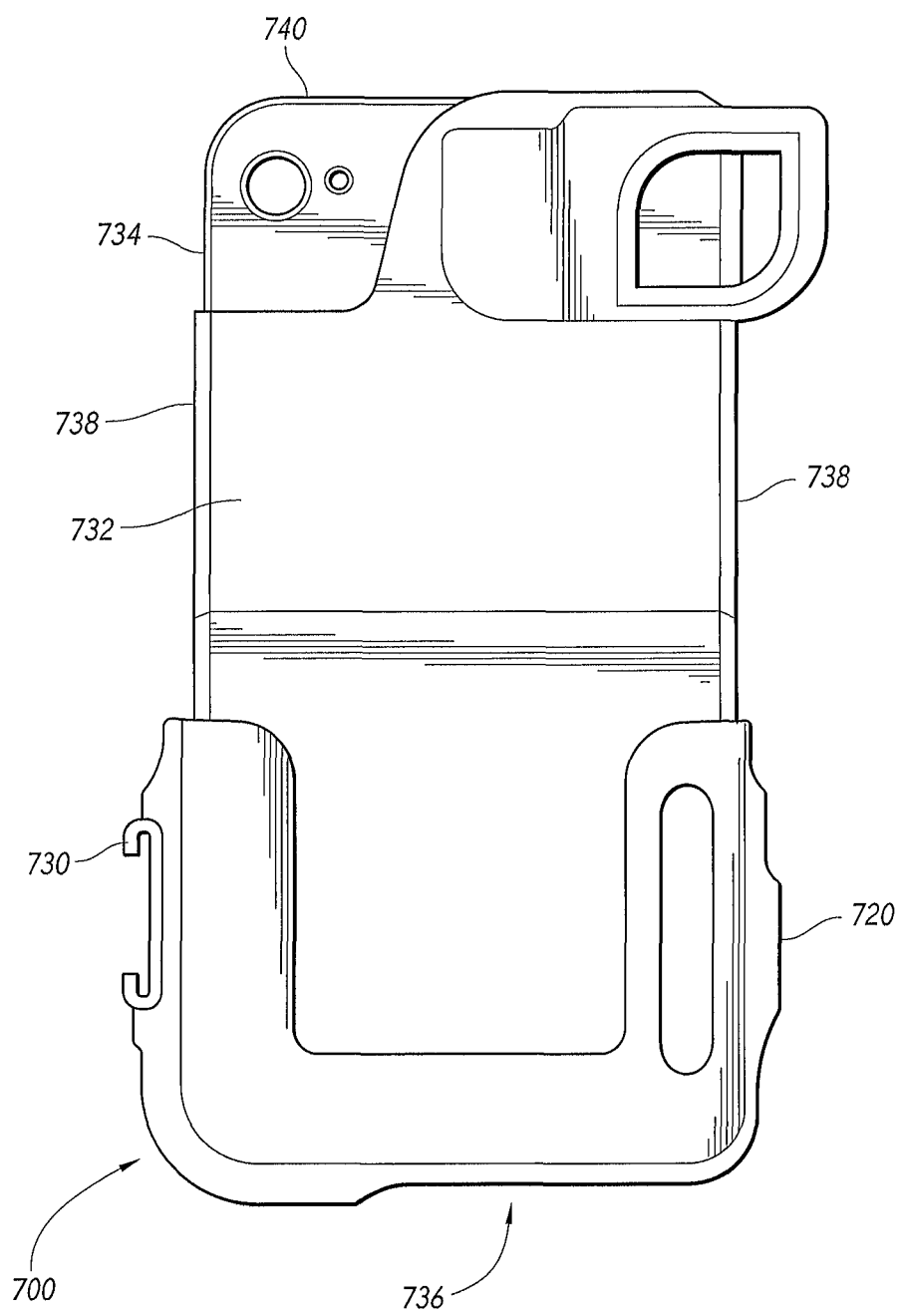
FIGS. 1A-1B illustrate an embodiment of a modular accessory adapter for use with a communication device or case for a communication device, the adapter providing components for using tripods and/or other accessories.

The present disclosure relates generally to protective cases and other accessories for communication devices. Many different structures, features, steps, and processes are shown and/or described in discrete embodiments for convenience, but any structure, feature, step, or process disclosed herein in one embodiment can be used separately or combined with or used instead of any other structure, feature, step, or disclosed in any other embodiment. Also, no structure, feature, step, or processes disclosed herein is essential or indispensible; any may be omitted in some embodiments.

The terms "protective cases" or "cases" as referred to herein, describe cases that are different from, separate from, removably attachable, and/or in addition to the shells, cases, or exterior housings that communication devices are packaged in (e.g., that form a part of the actual device) when originally constructed, sold, and/or produced by the manufacturer. Protective cases can cover the exterior of communication devices (e.g., mobile phones) or some portion thereof to cushion impacts, protect against scratches, add grip, change the aesthetics (e.g., allow a user to decorate portions of the device with different colors, jewelry, materials, shapes, text, backgrounds, graphics, etc.) and the like. Protective cases can include access regions, including exposed regions, moveable access regions, external actuators, cutaways, or openings for accessing features and components of the communication device on which the cases are installed, such as one or more onboard cameras, screens, buttons, electrical connectors, lenses, jacks, inputs, usb connections, vents, speakers, memory cards, finger-print readers, microphones, optical elements, etc. However, it can be difficult to attach an accessory or some other auxiliary structure to a communication device when the communication device is generally surrounded by the protective case. For example, the protective case may not permit direct access to the communication device, or the auxiliary structure may be specially sized for attachment to a communication device with a housing of a particular shape and size. As a result, the auxiliary structure may not fit appropriately on the communication device when the communication device is covered by the protective case. In addition, some protective cases may not provide all of the features desired by a user. Some examples of removable or modular accessories for mobile electronic devices (including the Olloclip® lens accessory) that can be used with the embodiments disclosed herein are illustrated and described in U.S. Pat. No. 8,279,544, which is titled "Selectively Attachable and Removable Lenses for Communication Devices" and which issued on Oct. 2, 2012, the contents of which are hereby incorporated by reference in their entirety.

Some aspects of this disclosure relate to protective cases and modular accessories for use with a communication device. The protective cases can expose areas or components of a communication device such that an accessory may be used with the communication device. For example, an auxiliary lensing component may be used with a communication device when an onboard camera lens, or some portion of the device that includes the camera, is exposed by the protective case. The terms "lensing component" or "lens" or any derivatives thereof and related terms are used in accordance with their customary meanings and includes any optical structure that alters or modifies one or more characteristics of light (including but not limited to magnification, attenuation, darkening, polarization, filtering, reflection, glare, color, image field, image shape, etc.) In some embodiments, an accessory may be added or attached to or used with a communication device, and the protective case can protect both the communication device and the accessory while the accessory is in use. For example, a lensing component may be attached to a communication device, and the device with the lensing component added may be inserted into a protective case. In some embodiments, separate components may be used to protect the accessory and the communication device (e.g., a protective enclosure for the communication device and a separate protective component for the accessory).

Additional aspects of the disclosure relate to modular accessories that may be used with a protective case and a communication device. In some embodiments, a case can comprise at least first and second separable parts. For example, a basic, low-weight, low-profile, foundational, or "sleek" first case part may provide basic protection for a communication device, generally closely conforming to the exterior shape of the communication device, while providing a low profile and a low amount of extra bulk and weight to the device. Such a case may be desirable for regular use due to the small amount of bulk and weight that it adds to the device. However, a user may also desire some additional features, such as those provided by larger or heavier cases and accessories, on an as-needed basis. To provide additional features and components to basic, low-profile, foundational, minimal, or "sleek" cases, modular accessories may be added to the cases by way of one or more additional parts, as desired. For example, battery packs, tripod mounts, flash or lighting units for cameras, and the like may be added. In some embodiments, the modular accessories may be added to the communication device instead of or in addition to a protective case.

Some examples of cases for communication devices or mobile electronic devices that can be used with the embodiments disclosed herein are illustrated and described in U.S. Patent Publication No. 2013/0206614, which is titled "Case for a Communication Device" and which published on Aug. 15, 2013, the contents of which are hereby incorporated by reference in their entirety. For example, in some embodiments, as illustrated, a case 110 can generally comprise at least a first case portion and a second case portion, with the first case portion movable relative to the second case portion. The movable first case portion can be configured to move from at least a first position in which the first case portion covers a specified area of a communication device, to a second position wherein a specified area of the communication device is exposed (e.g., made accessible for contact, securement, and/or other communications). In some embodiments, the specified area can comprise at least two generally parallel or at least two generally orthogonal sides of a communication device, such as a corner. In some embodiments, the exposed area on the communication device can include an onboard camera lens. The first case portion can be configured to reciprocate or otherwise move from a first position in which the first case portion covers the corner of the communication device (and onboard camera lens) to a second position in which the corner of the communication device is exposed. An auxiliary removable lens component may then be installed/attached to/used with the communication device.

In some embodiments, a case is attached to a communication device. A modular accessory adapter can be attached to the case 110 to facilitate use and/or attachment of a tripod, flash, microphone, or other photography accessories or other accessories. Such an adapter can include tripod mounts, non-powered accessory mounts ("cold shoes"), and the like, as described below and illustrated in subsequent figures. In some embodiments, powered accessory mounts ("hot shoes") or integrated microphones, flashes, batteries, diffusers and the like may be included in the modular tripod adapters instead of, or in addition to, the components illustrated in the figures.

In some embodiments, a modular accessory adapter is configured to be installed to a protective case attached to a communication device. In other embodiments, a modular accessory adapter is configured to be installed directly to the communication device when a protective case is attached to the communication device. While in certain embodiments, a modular accessory adapter is configured to be installed directly to the communication device without a protective case attached to the communication device. In some embodiments, the modular accessory adapter is configured to be installed or mounted directly to both the communication device and a protective case attached to the communication device. In some embodiments, the modular accessory adapter is configured to be installed or mounted directly to the communication device when a protective case is not attached to the communication device and is configured to be installed or mounted directly to a protective case when a protective case is attached to the communication device.

Embodiments of modular tripod adapters are shown and described herein. Some examples of tripod adapters, cases structures, components, and devices for communication devices or mobile electronic devices that can be used with and incorporated into the embodiments disclosed herein are illustrated and described in U.S. Patent Publication No. 2013/0206614 referred to above. Each embodiment can include one or more tripod mounts, cold shoes, hot shoes, and the like positioned on different portions of the tripod adapter. In some embodiments, the modular tripod adapters may be made from molded polycarbonate or some other material. In some embodiments, the modular tripod adapters may include one or more gripping areas, such as one or more flexible or resilient regions (e.g., overmolded rubber or rubbery grips). In some embodiments, the modular tripod adapters can be made in different colors and have different graphics (e.g., logos, pictures, text, etc.)

Although the modular accessory adapters of the figures herein are referred to as tripod adapters, in some embodiments the modular accessory adapters may not include tripod mounts. The accessory adapters may include cold shoes, hot shoes, and/or other accessories or mounts as described herein. In some embodiments, the modular accessory adapters may omit or not include one or more of any of the mounts and/or accessories described herein.

In some embodiments, a tripod adapter may include one or more exposed high-strength materials, such as metallic (e.g., brass) insert tripod mounts, while in some embodiments a tripod adapter may include recessed or flush tripod mounts. In some embodiments, a tripod adapter may include a metallic cold shoe.

As described herein, in some embodiments, the tripod adapters may be molded or cast in a general I-beam form, that generally surrounds a bottom and at least a portion of two side edges of a communication device. The I-beam design can provide stability and strength while reducing the amount of material used in the tripod adapter and the weight thereof. In some embodiments, tripod adapters may include high-strength mounts, such as anodized aluminum tripod mounts; nickel plated tripod mounts; brass tripod mounts; tripod mounts molded, cast, or constructed from some other material; or any combination thereof. In some embodiments, a tripod adapter may include an engagement mechanism or retaining structure (e.g., pin, protrusion, aperture) for attaching or otherwise securing a keychain or lanyard to the tripod adapter. In some embodiments, a tripod adapter may partially or completely conceal a speaker or microphone of the communication device, or otherwise interfere with the passage of sound to and/or from the communication device. In some cases, a tripod mount may include a lip, channel, or other pathway, to help direct sound to and/or from sound components of the communication device.

In some embodiments, a tripod adapter may include one or more speaker chambers or channels that permit sound to pass to and/or from sound components of the communication device on which the tripod adapter is mounted.

In some embodiments, a tripod adapter may include one or more cable management clips. The cable management clips may be used to maintain cables that, e.g., run from a component installed in a cold shoe to the communication device. For example, a user may attach a modular tripod adapter, configured with a cold shoe, to a case or directly to a communication device. An auxiliary flash component can be used with the cold shoe. The auxiliary flash component may have an electrical wire with a plug or some other connector that can be coupled to the communication device to provide electrical power for the flash. Rather than letting the wire dangle away from the communication device, a user may use the cable management clip to hold the wire close to the communication device, thereby minimizing accidental snagging or unplugging of the wire. Each clip may include two or more retaining structures (e.g., tabs or tines). In some embodiments, one or more retaining structures may be biased toward another retaining structure or the tripod adapter to retain a cable or cord. In some embodiments, each clip may include multiple retaining structures that are configured to remain generally stationary. Cables or cords may be wrapped around the retaining structures or wedged in between a pair thereof.

Figure 1B:
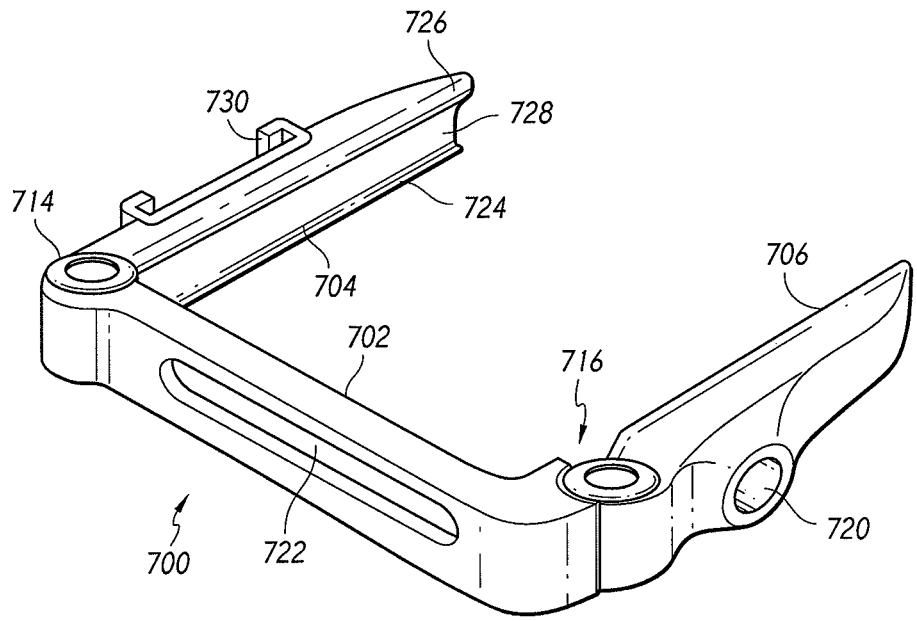
Figure 2:
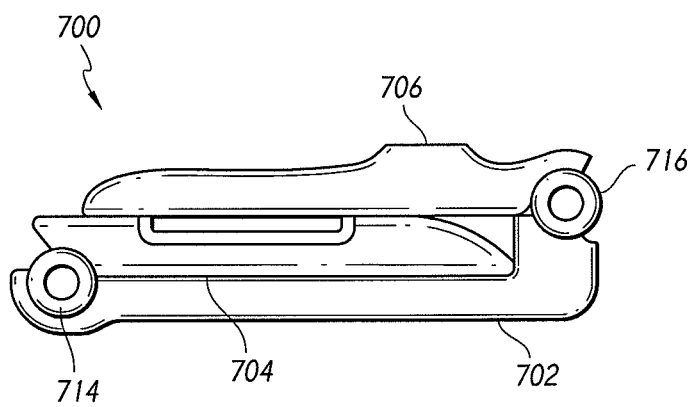
FIG. 2 illustrates a top view of the modular accessory adapter of FIGS. 1A-1B in a folded position.

FIGS. 1A-2 illustrate an embodiment of a tripod adapter 700 that is removably attachable to a communication device 734 and/or case 732. In some embodiments, a tripod adapter 700 may include a plurality (e.g., two) side arms or members 704, 706 coupled to a base arm or member 702 at pivots 714 and 716 (e.g., hinges, pins, joints, ball joints). The pivots 714 and 716 can allow a user to fold (e.g., move, rotate, deflect, deform, pivot, stretch, extend, retract) the tripod adapter 700 into a smaller size (e.g., compact, sleek, low profile) such that the tripod adapter 700 may be more portable or otherwise take up less space when not in use. When a tripod adapter 700 takes up less space when not in use, users may be more likely to carry the adapter 700.

As described above, in some embodiments, the tripod adapter 700 may include one or more tripod mounts 720 or other accessory mounts. When multiple tripod mounts (or other mounts) are included, the tripod mounts 720 (or other mounts) may be positioned on different members or edges of the adapter (e.g., on two edges orthogonal to each other) such that the communication device may capture photographs in either portrait or landscape format, depending upon which tripod mount is used. Each tripod mount 720 may be a threaded metal insert capable of receiving a standard tripod screw, such as those typically found on photography tripods. In some embodiments, the tripod mount(s) 720 may be made of brass or aluminum and insert molded with the tripod adapter. In some embodiments, the tripod mounts 720 may be substantially the same or entirely the same material as the remainder of the tripod adapter 700.

An external flash accessory (not shown) may be mounted onto the tripod adapter 700 for use with the communication device 734. The tripod adapter 700 illustrated in FIGS. 1A-2 may include one or more accessory mounts (e.g., shoes, tripod mounts 720) for receiving such a flash accessory or other accessory. The external flash accessory may be controlled by the communication device 734 through a number of different connections or other types of communication. For example, the mount may be a "hot" shoe that provides a physical connection from the communication device 734 to the flash accessory. As another example, the mount may be a "cold" shoe 730. In such cases, the flash accessory may plug into the communication device 734 via a wired connection, or the communication device 734 may control the flash accessory via a wireless connection (e.g., Bluetooth). The mount may be a metal component (e.g., brass or aluminum) insert molded with the tripod adapter 700, as described with respect to the tripod mounts 720 above. In some embodiments, the mount may be made of substantially the same material as the remainder of the tripod adapter 700.

As shown in FIG. 1A, in some embodiments, the pivots 714 and 716 may be formed from the same material (e.g., molded polycarbonate) as the rest of the tripod adapter 700. In some embodiments, one or both pivots 714 and 716 may be formed from different material (e.g., the pivots 714 and 716 may be metal hinges).

In some embodiments, one pivot 716 may be positioned further away from the base member 702 of the tripod adapter 700 than the other pivot 714 is, allowing one side member 706 to be pivoted/folded over on top of the other side member 704, as shown. For example, the side members 704, 706 can be moved (e.g., rotated, pivoted, folded, deflected, deformed, stretched, extended, retracted) between a first position (e.g., unfolded, in-use, open, wide) wherein both the side members 704, 706 are generally orthogonal relative to the base member 702 as illustrated in FIGS. 1A-1B and a second position (e.g., folded, closed, compact, stored, narrow) as illustrated in FIG. 2 wherein the side members 704, 706 and the base member 702 extend generally parallel relative to one another. In the first position, the side members 704, 706 are unfolded and the tripod adapter 700 is configured to be attached (e.g., secured, mounted, engaged, installed) to the protective case 732 and/or the communication device 734 such that at least a portion or surface of the base member 702 and/or side members 704, 706 are in direct physical contact with at least a portion or surface of the protective case 732 and/or the communication device 734. In some embodiments, the tripod adapter 700 can also be detached or disengaged from the protective case 732 and/or the communication device 734 in the first position. After detaching the tripod adapter 700 from the protective case 732 and/or the communication device 734 such that the base member 702 and/or side members 704, 706 are not in physical contact with the protective case and/or the communication device, a user can move (e.g., rotate, fold, pivot, deflect, deform, stretch, extend, retract) the side members 704, 706 to the second position for storage. In the second position, the side member 706 and the side member 704 can be folded or pivoted such that they overlap each other in a generally horizontal plane. The side members 704, 706 can also be folded or pivoted to overlap the base member 702 in a generally horizontal plane.

In some embodiments, the base member 702 and/or side members 704, 706 comprise one or more engagement members, retention mechanisms or portions configured to facilitate installment, secure attachment or engagement of the tripod adapter 700 to the protective case 732 and/or communication device 734 in the first position (and/or second position). For example, the engagement member(s) of the base member 702 and/or side members 704, 706 can comprise a recess, protrusion, aperture, detent, peripheral cutout, channel, and/or other engageable structure configured to engage one or more portions, edges, lips, surfaces and/or other corresponding or complementary engagement members (e.g., recess, hole, protrusion, aperture, detent, peripheral cutout, channel) of the communication device 732 and/or protective case 734.

In some embodiments, the engagement members(s) of the base member 702 and/or side members 704, 706 can engage (e.g., secure, receive, fit) or are configured to engage the corresponding or complementary retention mechanism(s), engagement structure(s), or engagement member(s) of the communication device 734 and/or case 732 for securing, installing, or engaging the tripod adapter 700 relative to the communication device 734 and/or protective case 732. For example, the complementary or corresponding engagement members can comprise a protrusion (e.g., prong, hook) configured to be received within a hole, slot, pocket or aperture. In some embodiments, the protrusion includes a bulbous head portion having a generally circular, oval, rectangular, or cone cross sectional shape. The bulbous portion can be configured to be inserted into the complementary engagement member (e.g., hole) having an entrance portion with a smaller cross section area or diameter than the bulbous portion and an enlarged portion, such that the bulbous portion can deform as it is inserted into the engagement member (e.g., hole) and then at least partially rebound to its original size and shape in the enlarged portion of the engagement member. The bulbous portion can provide an interference fit with the enlarged portion to help secure the tripod adapter 700 to the communication device 734 and/or case 732.

In the illustrated embodiment of FIGS. 1A-2, the tripod adapter 700 is configured to slidably receive, support, and/or be coupled with at least a portion of an outer peripheral edge of the communication device 734 and/or protective case 732. In some embodiments, this type of configuration results in an interference fit or rigid coupling between the tripod adapter 700 and the communication device 734 and/or case 732. In this regard, one or both of the side members 704, 706 (and/or base member 702) can comprise a first flange 726 (e.g., top, back, posterior) and a second flange 724 (e.g., bottom, front, anterior). The first and second flanges 726, 724 can extend generally parallel to each other and define a space or channel 728 therebetween. In use, the tripod adapter 700 can be fitted onto the communication device 734 and/or protective case 732 such that an outer peripheral edge portion of the communication device 734 and/or protective case 732 (e.g., sides 738, bottom edge 736, top edge 740) is received into the space or channel 728 of the side members 704, 706 (and/or base member 702) as discussed below.

For some embodiments, the side members 704, 706 and/or base member 702 of the tripod adapter 700 can be configured to comprise a magnetic area or magnetic portion (not shown). The magnetic area can extend at least partially along the width or length of the flanges 724, 726, channel 728 or other surfaces of the side members 704, 706 and/or base member 702. However, it is contemplated that the magnetic area or portion can extend along the entire width or length of the flanges 724, 726, channel 728 or other surfaces of the side members 704, 706 and/or base member 702.

In accordance with an embodiment, it is contemplated that outer peripheral edges or other exterior surfaces of the communication device 734 and/or case 732 can further comprise a complementary magnetic area or portion (not shown) that can be magnetically coupled or configured to be coupled with the magnetic area of the tripod adapter 700. The complementary magnetic area or portions can cause the tripod adapter 700 to be drawn onto the communication device 734 and/or case 732 and into secure engagement. As such, the installation, attachment, and/or removal of the tripod adapter 700 can be advantageously facilitated through the magnetic engagement and attraction created by such a design. Thus, the tripod adapter 700 can be retained on the communication device 734 and/or case 732 upon attraction between the magnetic area of the tripod adapter 700 and the complementary magnetic area of the communication device 734 and/or case 732. In some embodiments, an adhesive (e.g., glue, velcro) can be used in place of the complementary magnetic areas.

In some implementations, the magnetic area of the tripod adapter 700 can be configured to comprise a magnet. Alternatively, the magnetic area can comprise a ferrous material that is magnetically attracted to a magnet. Similarly, in some implementations, the complementary magnetic areas of the communication device 734 and/or case 732 can comprise a magnet. Alternatively, the complementary magnetic areas of the communication device 734 and/or case 732 can comprise a ferrous material that is magnetically attracted to a magnet. The combination of the magnetic area of the tripod adapter 700 and the complementary magnetic area of the communication device 734 and/or case 732 can be configured such that one or both of the magnetic areas comprises a magnet. For example, in an embodiment, the tripod adapter 700 can comprise a magnet and the communication device 734 and/or case 732 can comprise a ferrous material that is magnetically attracted to the magnet of the tripod adapter 700.

In accordance with yet other embodiments, the first and second flanges 726, 724, of the side members (and/or flanges of the base member 702) can extend generally parallel to each other and can be attachable to and receive one or more outer peripheral edges and/or surfaces of the communication device 734 and/or protective case 732 with interior surfaces of the flanges 726, 724 being seated against one or more peripheral edges and/or surfaces of the communication device 734 and/or protective case 732 for releasably retaining the tripod adapter 700 on the communication device 734 and/or protective case 732. In this regard, the flanges can create a snap or interference fit between the tripod adapter 700 and the communication device 734 and/or protective case 732. The peripheral edges and/or surfaces of the communication device 734 and/or protective case 732 can comprise one or more indentations, apertures, protrusions, or other engagement member that can engage a corresponding or complementary engagement member of the flanges 726, 724. The engagement between the complementary engagement members of the flanges 726, 724 and the communication device 734 and/or protective case 732 can secure the tripod adapter 700 to the communication device 734 and/or protective case 732.

As illustrated in FIG. 1A, the tripod adapter 700 (or other modular accessory adapter that may be used with the case 732) may be installed on the case 732 by sliding the tripod adapter 700 over a portion of the case 732 (e.g., outer peripheral edges and/or exterior surfaces). The case 732 may include a channel, slot or recess (not shown) on one or more edges of the case 732 (e.g., on a surface orthogonal to an external surface of the case and/or directly on an external surface portion of the case 732). A corresponding raised ridge and protrusion (not shown) on one or more interior edge surfaces (e.g., of flanges 724, 726, channel 728 of one or more side members and/or base members) of the tripod adapter 700 may fit or be configured to fit within the channel to slidably receive or guide installation of the tripod adapter 700 onto the case 732. A channel or recess (not shown) on case 732 may be configured to accept the protrusion of the tripod adapter 700 and secure the tripod adapter 700 to the case 732 by resisting any movement of the protrusion away from the recess once the protrusion enters the recess or channel.

In some embodiments, a case 732 may have two or more channels, such as channels on generally opposite parallel edges of the case 732. The tripod adapter 700 may also have two or more corresponding ridges on two or more parallel interior surfaces of the tripod adapter 700 configured to fit within the one or more channels of the case 732. In some embodiments, the tripod adapter 700 may include one or more channels 728, slots and/or recesses, and the case 732 may include one or more corresponding ridges and/or protrusions configured to fit within the channels 728 to slidably receive, secure, or guide installation of the tripod adapter 700 onto the case 732.

In some embodiments, the tripod adapter 700 may include one or more channels 728, slots, and/or recesses, and the communication device 734 may include one or more corresponding ridges and/or protrusions configured to fit within the channels 728 to slidably receive or guide installation of the tripod adapter 700 directly onto the communication device 734. In some embodiments, the tripod adapter 700 may include one or more ridges and/or protrusions, and the communication device 734 may include one or more corresponding channels and/or recesses to receive or are configured to slidably receive the ridges and/or protrusions to guide installation of the tripod adapter 700 directly onto the communication device 734.

As illustrated in some embodiments, with reference to FIGS. 1A-2, the base member 702 and side members 704, 706 are configured to surround or receive generally the entire bottom surface or edge 736 of the communication device 734 and/or case 732 and portions of the side surfaces or edges 738 of the communication device 734 and/or case 732 when attached or installed. However, in other embodiments, the base member 702 and side members 704, 706 are configured to surround or receive generally the entire top surface or edge 740 of the communication device 734 and/or case 732 and portions of the side surfaces or edges 738 of the communication device 734 and/or case 732 when attached or installed. Further, in some embodiments, the base member 702 and side members 704, 706 are configured to surround or receive generally an entire side (e.g., lateral, right and/or left) surface or edge 738 of the communication device 734 and/or case 732 and portions of the top and/or bottom surfaces or edges 740, 736 of the communication device 734 and/or case 732 when attached or installed.

Some communication devices 734 may include a port on an edge or other surface. The port may be used to connect an accessory or a cable to the communication device, such as a battery charger, a Universal Serial Bus (USB) cable, a micro USB cable, etc. In some cases, the communication device 734 may include such a port on an edge that may be covered by the tripod adapter 700. The tripod adapter 700 can include an opening 722 (e.g., window, cut-out, recess, aperture), as illustrated in FIG. 1B, to permit access to the port of the communication device 734 even when the tripod adapter 732 is installed on the communication device 734.

In some embodiments, as illustrated in FIG. 1B, the base member 702, pivots 714, 716 and/or side members 704, 706 comprise one or more distinct, separate components or pieces. For example, in some embodiments, side member 704 is configured to be attached to base member 702 at pivot 714 in a snap-fit type configuration, such that side member 704, base member 702, and pivot 714 include only two distinct pieces, parts, members, and/or elements. In some embodiments, side member 704, base member 702, and pivot 714 include two or more (e.g., two, three, four, five, six, seven, eight, nine, and/or ten) distinct pieces, parts, members, and/or elements. Side member 706, base member 702, and pivot 716 can be configured in a similar manner or fashion as side member 704, base member 702, and pivot 714.

In some embodiments, the base member 702, pivots 714, 716 and/or side members 704, 706 are formed or combined into one or more (e.g., one, two, three, four, five, six, seven, eight, nine, ten) monolithic pieces or components. For example, the base member 702, pivots 714, 716 and side members 704, 706 can form one monolithic component which is deflectable into at least a first and second position as discussed above. In some embodiments, the components and/or members of the tripod adapter 700 comprise an elastic or deformable material such that a user can apply a force to deflect the side members into the second position from the first position. In some embodiments, the tripod adapter 700 comprises a sufficiently resilient material such that a user can apply a force to deflect (e.g., stretch, bend or deform) one or more of the base member 702 and/or side members 714, 716 from the first position (and/or second position) to the second position (and/or first position) and the one or more base member 702 and/or side members 714, 716 will return or are configured to return or rebound to the first position (and/or second position) when the force is removed by the user or the user releases the one or more base member 702 and/or side members 714, 716.

In some embodiments, a tripod adapter 700 comprises one or more base members 702 and/or side members 704, 706. The one or more base members 702 and/or side members 704, 706 can extend generally parallel to one another (e.g., base member to base member and/or side member to side member). The one or more base members 702 and/or side members 714, 716 are configured to be deflectable or are deflectable from one another such that a user can deflect one or more of the base members (and/or one or more side members) from one or more other base members (and/or one or more side members) from one position (e.g., open and/or closed) to a second position (e.g., closed and/or open position) by applying a force (e.g., extending, stretching, compressing, pushing) to deflect one member toward or away from another member. In some embodiments, the members will return or rebound (e.g., deflect back, bias) to the original (e.g., first and/or second) position from the second (e.g., deflected position) after the force is removed from the member or the user releases the member. In some embodiments, a force is applied by the user to the members to deflect the members away from one another to an open or wider position such that the tripod adapter 700 can be received or installed onto the communication device 734 and/or case 732. When the force is removed by the user or the member released, the tripod adapter 700 (or members) can return to their original state or position (e.g., closed, narrow, compact) such that the tripod adaptor 700 is secured, engaged or retained onto the communication device 734 and/or case 732.

FIGS. 3A-6B show other embodiments of compact, small tripod adapters. Any structure, feature, step, or process disclosed in the above embodiments can be used separately or combined with or used instead of any other structure, feature, step, or disclosed in any of the embodiments of tripod adapters disclosed herein. For example, any of the type of engagement members of the tripod adapter 700 can be used with any of the tripod adapters of FIGS. 3-6. Additionally, any structure, feature, step, or process disclosed in the embodiments of FIGS. 3-6 can be used separately or combined with or used instead of any other structure, feature, step, or disclosed in any of the embodiments of tripod adapters disclosed herein.

Figure 3A:
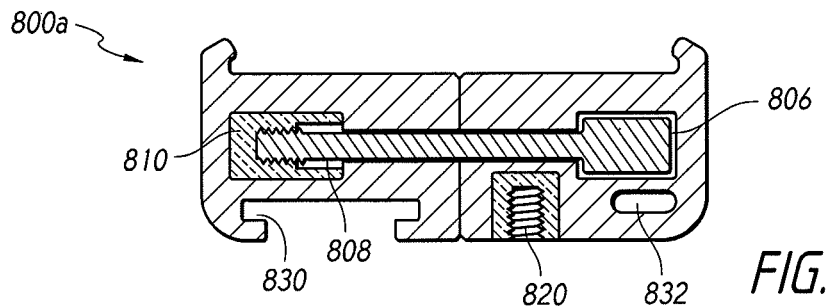
FIG. 3A illustrates a cross-sectional view of an embodiment of a modular accessory adapter for use with a communication device or case for a communication device, the adapter providing components for using tripods and/or other accessories.
Figure 3B:
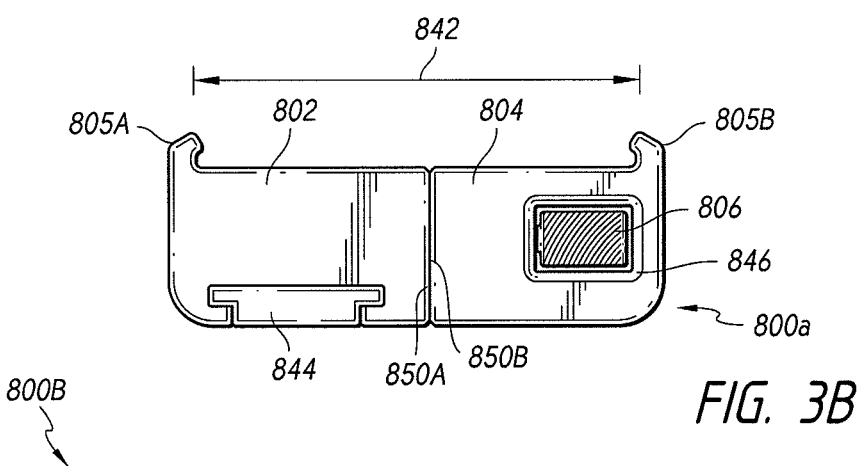
FIG. 3B illustrates a top view of the modular accessory adapter of FIG. 3A.
Figure 3C:
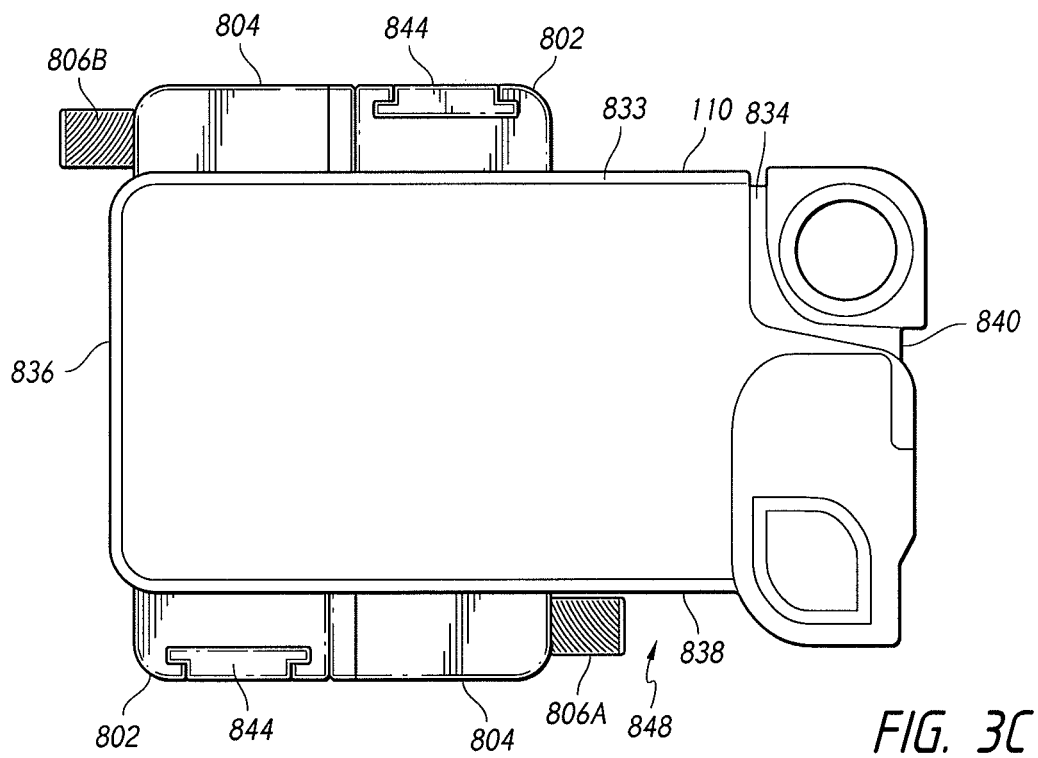
FIG. 3C illustrates a top view of an embodiment of a modular accessory adapter for use with a communication device or case for a communication device, the adapter providing components for using tripods and/or other accessories.

In some embodiments, as illustrated in FIGS. 3A-3C, a tripod adapter 800a, 800b may include a first portion (e.g., member, component, etc.) 802 and a second portion 804 movable (e.g., slidable, rotatable, pivotable, deflectable, deformable) relative to each other in a generally medial-lateral, anterior-posterior, vertical. horizontal, and/or angular direction.

Figure 4A:
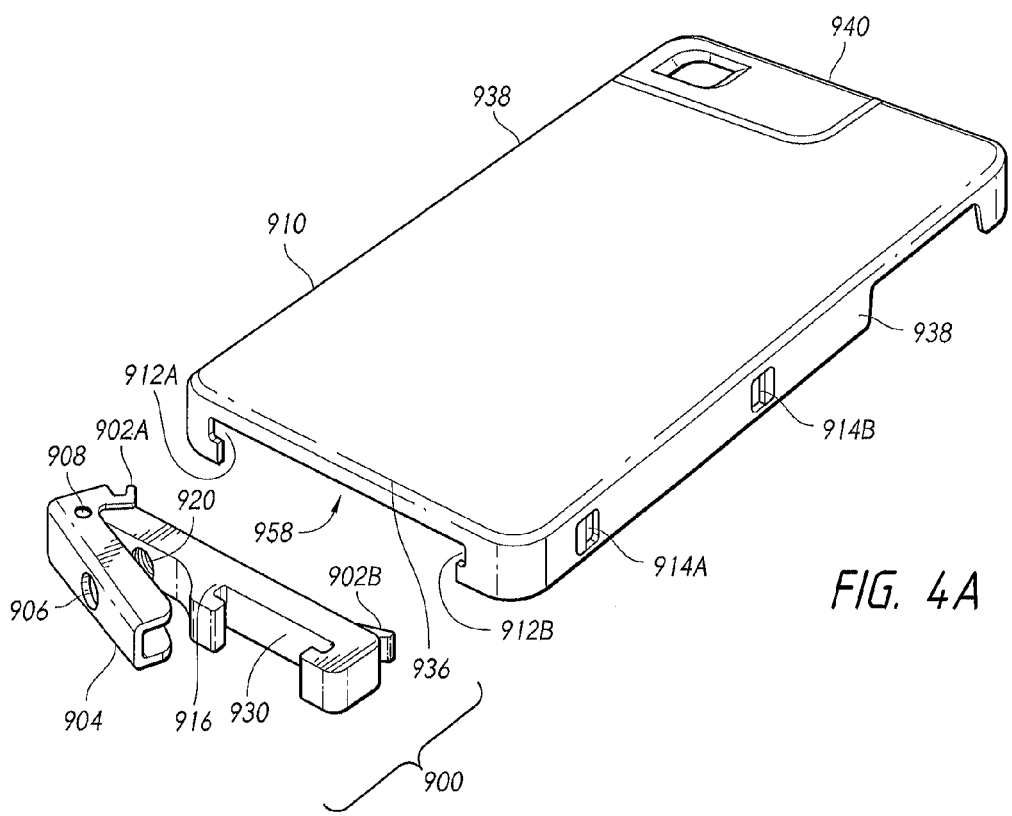
FIG. 4A illustrates an embodiment of a modular accessory adapter for use with a communication device or case for a communication device, the adapter providing components for using tripods and/or other accessories.

The first and second portions 802, 804 can include contact portions 805A, 805B respectively, such as in the form of protrusions (e.g., one or more hooks, prongs, clips, angled edges, lips, ridges). The contact portions 805A, 805B are received or configured to be received within corresponding or complementary engagement members (e.g., holes, slots detents, apertures, recesses, cut-outs) formed in the case 110 and/or communication device 834. For example, the contact portions 805A, 805B can be inserted into corresponding or complementary slots or holes of the communication device 834 and/or case 110. The communication device 834 and/or case 110 can comprise slots and/or holes as illustrated in FIG. 4A with respect to the slots 912 and holes 914 of case 910.

The distance, gap, and/or space 842 between the contact portions 805A and 805B can be increased or decreased or eliminated by a user by moving the first portion 802 away from or closer to the second portion 804 in order to "clip" onto or otherwise couple, secure, install, or engage to a case 110 of a communication device 834 and/or the communication device 834. For example, a user may turn a dial or knob 806 of the second portion 804 (or first portion 802), thereby partially or completely withdrawing, detaching, or disengaging an interior elongate member 808 (e.g., a metallic rod or screw) from a retainer 810 (e.g., a threaded brass insert) of the first portion 802 (or second portion 804), or otherwise causing the first portion 802 (or second portion 804) and second portion 804 (or first portion 802) to be generally extended away from each other (e.g., first position) and/or brought toward from each other (e.g., second position).

In some embodiments, tripod adapters 800A, 800B include one or more contact surfaces that spaced apart or are configured to be spaced apart from one another when the tripod adapters 800A, 800B are in a first position (e.g., open, unlocked, removable, disengaged, unsecured, detached) either removed from the communication device 834 and/or case 110 and/or in contact but unsecured with the communication device 834 and/or case 110. For example, in the first position, the contact portions 805A, 805B can be inserted into and/or removed from the corresponding or complementary engagement members (e.g., holes, slots) of the communication device 834 and/or case 110. The tripod adapters 800A, 800B remain unsecured to the communication device 834 and/or case 110 such that the tripod adapters 800A, 800B can be removed from or inserted into the communication device 834 and/or case 110. As illustrated in FIGS. 3A-3C, the first and second portions 802, 804 of the tripod adapters 800A, 800B include one or more corresponding surfaces 850A, 850B that contact or are configured to contact one another when the tripod adapters 800A, 800B are moved to a second position (e.g., closed, locked, installed, engaged, secured, attached) installed, locked, or coupled to the communication device 834 and/or case 110 as a result of the user turning the knob 806, 806A, 806B or dial. In the second position, the contact portions 805A, 805B are secured to or configured to be secured to the complementary or corresponding engagement members (e.g., holes, slots, etc.) of the communication device 834 and/or case 110 such that the tripod adapters 800A, 800B are securely fixed or coupled to the communication device 834 and/or case 110.

In some embodiments, the contact surfaces 850A, 850B are parallel to each other and make contact with each other along a generally vertical axis (e.g., at a 90 degree angle) as illustrated in FIGS. 3A-3C. However, in some embodiments, the contact surfaces 850A, 850B are parallel to each other and make contact with each other along an angled axis (e.g., less than 90 degrees or greater than 90 degrees). In some embodiments, the contact surfaces 850A, 850B make contact with each other along a generally horizontal axis.

As illustrated in FIGS. 3A-3C, the contact portions 805A, 805B of the tripod adapters 800A, 800B are angled or oriented toward each other (e.g., in a medial direction). In such a configuration, when the tripod adapters 800A, 800B are moved to the second position, the space 842 between contact portions 805A, 805B and/or the contact surfaces 850A, 850B is reduced, decreased and/or eliminated relative to the space 842 when the tripod adapters 800A, 800B are in the first position such that the contact portions 805A, 805B apply or are configured to apply a compressive force against a portion of the holes or slots they are received within to secure the adapter 800A, 800B to the communication device and/or case. The first and second portions 802, 804 are moved towards each other to move the tripod adapters 800A, 800B into the second position (e.g., engagement or securing position) from the first position (e.g., unlocked or unsecured position). The first and second portions 802, 804 are moved away from each other (e.g., in opposite lateral directions or edges) to move the tripod adapters 800A, 800B into the first position from the second position. The space 842 between contact portions 805A, 805B and/or the contact surfaces 850A, 850B is increased relative to the space 842 when the tripod adapters 800A, 800B are in the first position relative to the second position such that the contact portions 805A, 805B can be removed or installed into the complementary holes or slots of the communication device and/or case as the compressive force is reduced or eliminated in the first position.

However, in some embodiments, the contact portions 805A, 805B can be angled or oriented away from each other in opposite directions (e.g., towards opposite lateral directions or edges) as illustrated in one example in FIG. 4A with respect to clips 902A, 902B. In such a configuration, the contact portions 805A, 805B secure or are configured to secure the tripod adapters 800A, 800B to the communication device 834 and/or case 110 in the first position (e.g., when the first and second portions 802, 804 are extended away from each other) such that the contact portions 805A, 805B apply or are configured to apply a tensile force against a portion of the holes or slots they are received within to secure the adapter 800A, 800B to the communication device and/or case. When the tripod adapters 800A, 800B are moved to the second position, the space 842 between contact portions 805A, 805B and/or the contact surfaces 850A, 850B is reduced, decreased and/or eliminated relative to the space 842 when the tripod adapters 800A, 800B are in the first position. In this embodiment, when the tripod adapters 800A, 800B are in the second position, the contact portions 805A, 805B can be inserted into and/or removed or are configured to be inserted and/or removed from the corresponding or complementary engagement members (e.g., holes, slots, etc.) of the communication device 834 and/or case 110 as the tensile for is reduced or eliminated. The tripod adapters 800A, 800B remain unsecured to the communication device 834 and/or case 110 such that the tripod adapters 800A, 800B can be removed from or inserted into the communication device 834 and/or case 110 in the second position. In such a configuration, the first and second portions 802, 804 are moved towards each other (e.g., in a medial direction) to move the tripod adapters 800A, 800B into the second position (e.g., unlocked or unsecured position) from the first position (e.g., engagement or securing position). The first and second portions 802, 804 are moved away from each other to move the tripod adapters 800A, 800B into the first position from the second position. Further, in some embodiments, the contact portions 805A, 805B can be oriented generally in the same direction or parallel to each other (e.g., downwardly, upwardly, at an angle, and/or straight ahead).

In some embodiments, one or more of the tripod adapters 800A and/or 800B can be attached or installed onto one or more edges (e.g., top 840, bottom 836 and/or sides 838) of the communication device 834 and/or case 110. For example, FIG. 8C, illustrates two tripod adapters 800B attached or installed onto parallel sides 838 of the case 110.

In some embodiments, the knob 806 may be accessible via an opening 846 (e.g., window, recess, cut-out, aperture) of the second portion 804 (or first portion 802) as illustrated in FIGS. 3A-3B. Such a configuration can reduce, diminish or eliminate the knob 806 from protruding from the communication device 834 to create a more, sleek look and/or the difficulty in accessing the knob in certain case configurations as discussed below.

However, in some embodiments, the knobs 806A, 806B can extend outwardly away from the second portion 804 (or first portion 802) of the tripod adapters 800B, protruding from the communication device 834 as illustrated in FIG. 3C when the adapter 800B is installed or attached to the communication device 834 and/or case 100. In some embodiments, the knobs 806A, 806B protrude towards the top and/or bottom edges 840, 836 respectively when the tripod adapter 800B is attached or installed to side edges 838. In some embodiments, the knobs 806A, 806B protrude towards the side edges 838 when the tripod adapter 800B is attached to bottom and/or top edges 836, 840.

In some embodiments, the knobs 806A and/or 806B may extend at an oblique angle (e.g., diagonally) with respect to the lateral axis of the tripod mount 800b. Such a configuration can diminish the amount of protrusion from the communication device 834 and the difficulty in accessing the knobs 806A, 806B in certain case configurations. For example, as illustrated in FIG. 3C, the knob 806A extends towards an area 848 that can be difficult for a user to access because of the limited space between the protruding knob 806A and a portion of the case 110.

In some embodiments, the knobs 806, 806A, 806B can include a classic symmetrical oval or circular head. However, in other embodiments, the knob heads can include various other shapes including chamfered, hexagonal, angled, rounded, and/or bulbous middle portion. In some embodiments, the heads of the knobs can comprise various diameters including a wider middle portion and more narrow top and bottom portions relative to the middle portions.

In some embodiments, the elongate member 808 can be moved a sufficient distance after a small number of turns (e.g., one turn, two turns, three turns, etc.) to permit removal or attachment of the adapters 800A, 800B, to diminish user fatigue (e.g., to move the adapters 800A, 800B between the first and second positions).

In some embodiments, one or more mounts of the tripod adapters 800A, 800B (e.g., tripod mount 820, cold shoe mount 830, hot shoe mount) can be configured to receive a cover 844. The cover 844 can be received into the one or more mounts when an accessory is not attached to the mount to cover such mounts in order to cover or close the mounts and/or to give the adapters 800A, 800B a more sleek, uniform, and/or level appearance.

In some embodiments, the tripod adapters 800A, 800B can include a keychain hole, lanyard, pin, protrusion, rod, and/or aperture 832 configured to receive or engage with a keychain and/or keyring as discussed with respect to other embodiments.

Figure 4B:
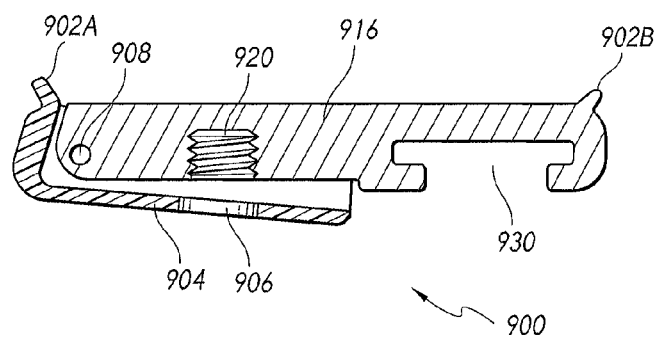
FIG. 4B illustrates a cross-sectional view of the modular accessory adapter of FIG. 4A.

FIGS. 4A-4B shows embodiments of a clip-on tripod adapter 900 that includes one or more clips 902A, 902B (e.g., protrusions, hooks, prongs, edges, lips, ridges, or other engagement members), a base portion or member 916, and a lever 904 for coupling the tripod adapter 900 to a case 910 (and/or communication device (not shown) as discussed with respect to other embodiments). The case 910 (and/or communication device) can include complementary or corresponding slots 912A, 912B and/or holes 914A, 914B (or other engagement structures) into which the clips 902A, 902B may be inserted or are configured to be inserted to secure, install, or attach the tripod adapter 900 to the case and/or communication device.

In some embodiments, the lever 904 is rotatably coupled to the base member 916 at a hinge pin 908 (e.g., rod, joint, pivot, etc) such that the lever 904 can rotate or pivot relative to the base member 916 between at least a first position (e.g., open) and a second position (e.g., closed). The clip 902A is positioned on a portion of the lever 904 and the clip 902B is positioned on a portion of the base member 916 in some embodiments, such that the clips 902A, 902B are oriented and/or in alignment at equal but opposite angles towards opposite directions (e.g., opposite lateral directions) when the lever 904 is in the second position. The clips 902A, 902B are oriented at different angles and towards opposite directions when the lever 904 is in the first position.

In some embodiments, the hinge pin 908 extends through at least a portion of both the lever 904 and base member 916. As illustrated in FIGS. 4A-4B, the axis of rotation of the hinge pin 908 extends in a direction parallel to a vertical axis extending in an anterior-posterior direction relative to the adapter when the tripod adapter 900 is attached to the communication device and/or case. However, in some embodiments, the axis of rotation of the hinge pin 908 extends in a direction transverse to the vertical axis extending in an anterior-posterior direction relative to the adapter when the tripod adapter 900 is attached to the communication device and/or case 910.

In some embodiments, when the tripod adapter 900 is in the second position or closed position, the lever 904 receives or overlaps a notch or cut-out portion of the base member 916 such that a rear exterior surface of the tripod adapter 900 is relatively planar, flat, or level and/or the rear exterior surfaces or walls of the tripod adapter extend out by the same distance or are in alignment. For example, the lever 904 includes first and second flanges and a channel formed therebetween. The channel of the lever 904 receives or is configured to receive a notch or cut-out portion of the base member 916 when the lever is moved to the second or closed position.

In some embodiments, a user can open (e.g., move, rotate) a lever 904 of the tripod adapter 900 to the first position (e.g., open position) to partially retract a clip 902A (e.g., from slots or holes 914), thereby allowing the clips 902A, 902B to be inserted into and/or removed from the slots 912 or holes 914 of the case 910. The user may then close (e.g., move, rotate in the opposite direction relative to when opening the lever 904) the lever 904 into the second position (e.g., closed position), thereby partially extending clips 902A, 902B into the complementary or corresponding slots 912A, 912B and/or hole 914A, 914B of the case 910 and securing the tripod adapter 900 to the case 910. The tripod adapter 900 is then secured to the case 910 until the lever 904 is opened again.

In some embodiments, the lever 904 is rotatably coupled to the base member 916 such that rotating the lever 904 in a clockwise direction moves the lever 904 from the second position to the first position and a counter-clockwise direction moves the lever 904 from the first position to the second position. In some embodiments, the lever 904 is rotatably coupled to the base member 916 such that rotating the lever 904 in a counter-clockwise direction moves the lever 904 from the second position to the first position and a clockwise direction moves the lever 904 from the first position to the second position.

In some embodiments, one or more of the tripod adapters 900 can be attached or installed onto one or more edges (e.g., top 940, bottom 936 and/or sides 938) of the communication device and/or case 910. For example, two tripod adapters 900 can be attached or installed onto parallel sides 938 of the case 910. In some embodiments, the tripod adapter 900 is configured to be secured or is secured to an opening or cut-out portion 958 positioned within a bottom edge 936 of the case 910.

The lever 904 can be securely engaged in the securing position (e.g., second or closed position) in a removable manner by way of any appropriate removable securing structure, such as a clip, snap-fit, or otherwise. In some embodiments, as illustrated, the lever 904 is securely engaged in the securing position by producing an alignment between one or more apertures 906, 920 on the lever 904 and on the base member 916 portions of the tripod adapter 900. The apertures 906, 920 can comprise internal threads configured to threadably receive a screw, bolt or other elongate connecting member into each of the apertures 906, 920 to secure the tripod adapter 900 to the case 910 and/or to the communication device itself and to simultaneously secure the lever 904 and base member 916 of the tripod adapter 900 to each other. In some embodiments, the apertures 906, 920 are configured to be a tripod mount to receive an engagement structure of a tripod. In such a configuration, when a tripod engagement structure is threaded or inserted into the apertures 906, 920, the tripod engagement structure secures or is configured to secure the tripod adapter 900 to the case 910 and/or to the communication device itself and simultaneously secures or is configured to secure the lever 904 and base member 916 of the tripod adapter 900 to each other.

In some embodiments, the base member 916 of the tripod adapter 900 includes one or more mounts (e.g., tripod mount, cold shoe 930, hot shoe, etc.).

Figure 5:
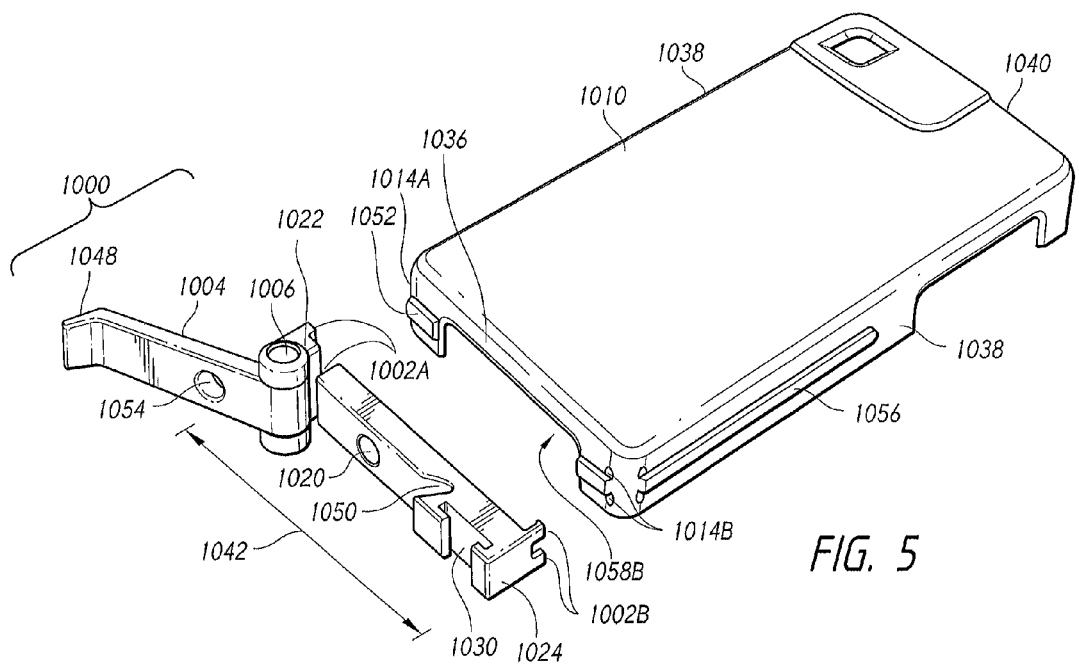
FIG. 5 illustrates an embodiment of a modular accessory adapter for use with a communication device or case for a communication device, the adapter providing components for using tripods and/or other accessories.

FIG. 5 shows additional embodiments of a clip-on tripod adapter 1000. In some embodiments, a clip-on multi-portion tripod adapter 1000 may include an adjustable-tension lever 1004. A first portion 1022 of the tripod adapter 1000 can slide into, along, or be received by a second portion 1024 of the tripod adapter 1000. In some embodiments, the second portion 1024 can slide into or be received by a first portion 1022 of the tripod adapter 1000 The effective width 1042 of the tripod adapter 1000 can be adjusted (e.g., increased or decreased) by moving the first portion 1022 at least partially into, along, or out of the second portion 1024 (or vice versa). In some embodiments, the first and/or second portions 1022, 1024 of the tripod adapter 1000 include one or more mounts (e.g., tripod mount 1020, cold shoe 1030, hot shoe, etc.).

In some embodiments, the lever 1004 may be coupled (e.g., rotatably, movably, pivotably) to either of the first or the second portions 1022, 1024 of the tripod adapter 1000 at least partly via an adjustment component 1006, such as a screw that may be tightened or loosened, to adjust the tension of the lever 1004 and the amount of pressure needed to manipulate the lever 1004 (e.g., move, rotate, slide, pivot, turn) relative to the first and second portions 1022, 1024. As illustrated in FIG. 5, the lever 1004 is rotatably coupled to the first portion 1022 such that the lever 1004 is movable between a first position (e.g., open, unsecured) and a second position (e.g., closed, secured).

In some embodiments, the lever 1004 is configured such that when it is moved or rotated to the first position, the effective width 1042 of the tripod adapter is increased as the first portion 1022 is at least partially moved out of or along the second portion 1024. When the lever 1004 is moved or rotated to the second position, the effective width 1042 of the tripod adapter 1000 is decreased relative to the first position as the first portion 1022 is at least partially moved into or along the second portion 1024.

In some embodiments, one or more of the tripod adapters 1000 can be attached or installed onto one or more edges (e.g., top 1040, bottom 1036 and/or sides 1038) of the communication device and/or case 1010. For example, two tripod adapters 1000 can be attached or installed onto a side 1038 of the case 1010 and a bottom edge 1036. In some embodiments, the tripod adapter 1000 is configured to be secured or is secured to an opening or cut-out portion 1058 positioned within or along a bottom edge 1036 of the case 1010. One or more edges or sides 1036, 1038, 1040 can include one or more complementary holes or slots 1014A, 1014B configured to receive engagement members of the first and second portions 1022, 1024.

In some embodiments, the first and second portions 1022, 1024 include engagement members configured to be received in and secured with complementary engagement members of the case 1010 and/or communication device. For example, the first and second portions 1022, 1024 can include a pair of double prongs, clips, or hooks 1002A, 1002B respectively. When the lever 1004 is in the open or first position, the double prongs 1002A, 1002B can be removed, received or inserted into holes or slots 1014A, 1014B in the case 1010. When the lever 1004 is moved to the closed, secured, or second position, the prongs 1002A, 1002B are oriented such that when they are received within the holes or slots 1014A, 1014B they impart or apply a compressive force to a wall portion of the holes or slots 1014A, 1014B to secure the adapter 1000 to the communication device and/or case 1010. In some embodiments, the double prongs 1002A, 1002B include a space therebetween configured to receive a lip, ridge or protrusion 1052, 1056 positioned on a side 1038 and/or edge 1036, 1040 of the case 1010 and/or communication device to facilitate attachment, securement, and/or engagement of the tripod adapter 1000 to the case and/or communication device.

In some embodiments, a securing portion of the lever 1004, such as an oblique end 1048 or handle, can be pivoted or otherwise moved and then nested into or otherwise connected with a notch, recess, or cut-out 1050 of the first or second portion 1022, 1024 into a securing position. The lever 1004 can be securely engaged in the securing position in a removable manner by way of any appropriate removable securing structure, such as a clip, snap, or otherwise.

In some embodiments, as illustrated, the lever 1004 is securely engaged in the securing position (e.g., second position) by producing an alignment between a plurality of apertures 1054, 1020 on the lever 1004 and on one of the first or second portions of the tripod adapter 1000. The apertures 1054, 1020 can comprise internal threads configured to threadably receive a screw or bolt or other elongate connecting member into each of the apertures 1054, 1020 to secure the tripod adapter 1000 to the mobile device case 1010 or to the communication device itself and to simultaneously secure the first and second portions 1022, 1024 of the tripod adapter 1000 to each other. In some embodiments, the apertures 1054, 1020 are configured to be a tripod mount to receive an engagement structure of a tripod. In such a configuration, when a tripod engagement structure is threaded or inserted into the apertures 1054, 1020, the tripod engagement structure secures or is configured to secure the tripod adapter 1000 to the case 1010 and/or to the communication device itself and simultaneously secures or is configured to secure the lever 1004 and the first and second portions 1022, 1024 of the tripod adapter 1000 to each other.

Figure 6A:
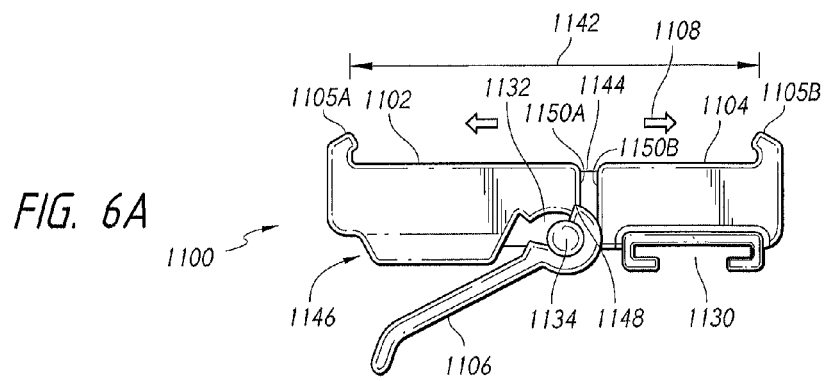
FIG. 6A illustrates an embodiment of a modular accessory adapter for use with a communication device or case for a communication device, the adapter providing components for using tripods and/or other accessories.
Figure 6B:
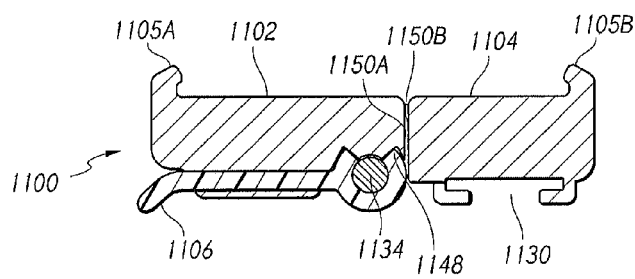
FIG. 6B illustrates a cross-sectional view of the modular accessory adapter of FIG. 6A.

FIGS. 6A-6B show additional embodiments of a clip-on tripod adapter 1100 in a first (e.g., open, unlocked, installing) and a second (e.g., closed, secured, engagement) position. In some embodiments, the tripod adapter 1100 may include a first portion 1102 and a second portion 1104 movable relative to each other. The portions 1102, 1104 can move towards or away from each other along a generally horizontal, vertical, or angled axis. A lever 1106 can be used to extend the first portion 1102 away from the second portion 1104, thereby allowing the tripod adapter 1100 to be clipped onto a case and/or communication device. The lever 1106 can then be closed, retracting the first portion 1102 towards the second portion 1104 and securing the tripod adapter 1100 to the case and/or communication device. In some embodiments, the first and/or second portions 1102, 1104 of the tripod adapter 1100 include one or more mounts 1130 (e.g., tripod mount, cold shoe, hot shoe, etc.).

The lever 1106 can be rotatably coupled to the first portion 1102, second portion 1104, and/or base member the first and second portions are configured to move along. In some embodiments, as illustrated in FIGS. 6A-6B, the lever 1106 is rotatably coupled to the first portion 1102 at a joint 1134 (e.g., hinge, pin, etc). The lever 1106 includes an oblique end or handle portion, a shaft or body portion, and U or C-shaped head portion configured to receive the joint 1134 at the opposite end of the lever 1106 as illustrated in FIGS. 6A-6B.

In some embodiments, a user can rotate the lever 1106 to move or extend the first portion 1102 away from the second portion 1106 to move the tripod adapter 1100 from the second position to the first position. As discussed above, when the adapter 1100 is in the first position, the adapter 1100 can be installed, attached, and/or removed from the case and/or communication device. Rotating the lever 1106 in the opposite direction or releasing the lever can move the first portion 1102 towards the second portion 1104 for securing and/or to secure the tripod adapter 1100 to the case and/or communication device.

In some embodiments, the lever 1106 is configured such that when it is moved or rotated to the first position, the effective width of the tripod adapter 1100, distance 1142 between clips 1105A, 1105B, and/or the gap 1144 between the first and second portions 1102, 1104 is increased as the first portion 1102 is extended away (e.g., in the direction indicated by arrows 1108) from the second portion 1104. When the lever 1106 is moved, rotated, and/or released by the user to the second position, the effective width of the tripod adapter 1100, distance 1142 between clips 1105A, 1105B, and/or the gap 1144 between the first and second portions 1102, 1104 is decreased relative to the first position as the first portion 1102 is moved towards or along the second portion 1024.

In some embodiments, the gap 1144 between the first and second portions 1102, 1104 in the second position, is reduced and/or eliminated such that wall portions or surfaces 1150A, 1150B of the first and second portions 1102, 1104 respectively, contact or are configured to contact each other. As illustrated in FIGS. 6A, 6B, these wall portions 1150A, 1150B can extend parallel to each other and/or contact each other along a 90 degree angle (e.g., vertical axis). However, in other embodiments, the wall portions 1150A, 1150B can extend parallel to each other and/or contact each other along a horizontal axis, or other non-zero angle (e.g., 45 degrees, etc).

In some embodiments, a portion or protrusion 1148 of the head portion of the lever 1106 is configured to fit or enter into the gap 1144, space, and/or area between wall portions 1150A and 1150B of the first and second portions 1102, 1104, as the lever 1106 is rotated and the tripod adapter 1100 moved from the second position to the first position. The portion 1148 pushes or presses against the wall portions 1150A, 1150B as the lever 1106 is rotated to the first position to extend the wall portions 1150A, 1150B away from each other, effectively increasing the gap 1144. As the lever 1106, is moved back or released to the second position, the portion 1148 is rotated, moved, or exited out of the gap 1144 and out of contact with the wall portions 1150A, 1150B, effectively decreasing or eliminating the gap 1144 resulting in the wall portions 1150A, 1150B moving towards each other and returning to the second position. The first and/or second portions 1102, 1104 can be configured with a recess or cut-out 1132 generally following or corresponding to the shape of the head portion of the lever 1106 to accommodate movement of the head portion as the portion 1148 rotates in and out of the gap 1144 as the tripod adapter 1100 is moved between the first and second positions.

As in other embodiments discussed above, one or more of the tripod adapters 1100 can be attached or installed onto one or more edges (e.g., top, bottom and/or sides) of the communication device and/or case. For example, two tripod adapters 1100 can be attached or installed onto a side of the case and a bottom edge, respectively. In some embodiments, the tripod adapter 1100 is configured to be secured or is secured to an opening or cut-out portion positioned within or along a bottom edge of the case. One or more edges or sides can include one or more complementary holes or slots configured to receive engagement members of the first and second portions 1102, 1104.

In some embodiments, the first and second portions 1102, 1104 include engagement members configured to be received in and secured with complementary engagement members of the case and/or communication device. For example, the first and second portions 1102, 1104 can include a pair of prongs, clips, or hooks 1105A, 1105B respectively. When the lever 1106 is in the open or first position, the prongs 1105A, 1105B can be removed, received or inserted into corresponding holes or slots in the case and/or communication device. When the lever 1106 is moved to or released to the closed, secured, or second position, the prongs 1105A, 1105B are oriented such that when they are received within the holes or slots they impart or apply a compressive force to a wall portion of the holes or slots to secure the adapter 1100 to the communication device and/or case.

In some embodiments, a portion of the lever 1106, such as an oblique end and/or shaft or body, can be pivoted or otherwise moved and then nested into, received or otherwise connected with a notch, recess, cut-out 1146 (e.g., channel formed between top and bottom flanges) of the first or second portions 1102, 1104 into a securing or nested position. The lever 1106 can be received in the notch 1146 such that the lever overlaps with the first and/or second portions 1102, 1104 in a generally vertical plane. This can provide an improved compact appearance or look of the adapter 1100. The lever 1104 can be securely engaged in the securing position in a removable manner by way of any appropriate removable securing structure, such as a clip, snap, or otherwise. In some embodiments, a biasing mechanism connected to the first and/or second portions 1102, 1104 can maintain the lever in the secured or second position when the lever 1106 is released by the user.

In some embodiments, as illustrated, the lever 1106 is securely engaged in the securing position (e.g., second position) by producing an alignment between a plurality of apertures (not shown) on the lever 1106 and on one of the first or second portions of the tripod adapter 1100. The apertures can comprise internal threads configured to threadably receive a screw or bolt or other elongate connecting member into each of the apertures to secure the tripod adapter 1100 to the mobile device case or to the communication device itself and to simultaneously secure the first and second portions 1102, 1104 of the tripod adapter 1100 to each other. In some embodiments, the apertures are configured to be a tripod mount to receive an engagement structure of a tripod. In such a configuration, when a tripod engagement structure is threaded or inserted into the apertures, the tripod engagement structure secures or is configured to secure the tripod adapter 1100 to the case and/or to the communication device itself and simultaneously secures or is configured to secure the lever 1106 and the first and second portions 1102, 1104 of the tripod adapter 1100 to each other.

In some embodiments, the tripod adapter 1100 includes a biasing mechanism (e.g., spring) configured to bias the first and second portions 1102, 1104 together back to the second position from the first position when the lever 1106 is released by a user.

Additional embodiments of a clip-on tripod adapter may include an actuator such as a dial or a lever that pivots or rotates laterally or otherwise moves about one end of the tripod adapter, partially extending a first portion of the tripod adapter away from a second portion of the tripod adapter in the process and allowing the tripod adapter to be coupled to a case and/or communication device. In some embodiments, a rack-and-pinion moveable connection between the actuator and the second portion can provide the movement between the first and second portions. As illustrated, in some embodiments, the first portion of the tripod adapter can include a clip, clasp, or other protruding or securing portion. The lever can then be pivoted or rotated in the opposite direction, partially retracting the clip and securing the tripod adapter to the case.

Although these inventions have been disclosed in the context of a certain preferred embodiments and examples, it will be understood by those skilled in the art that the present inventions extend beyond the specifically disclosed embodiments to other alternative embodiments and/or uses of the inventions and obvious modifications and equivalents thereof. It is also contemplated that various combinations or subcombinations of the specific features and aspects of the embodiments may be made and still fall within the scope of these inventions. Accordingly, it should be understood that various features and aspects of the disclosed embodiments can be combine with or substituted for one another in order to form varying modes of the disclosed inventions. Thus, it is intended that the scope of at least some of the present inventions herein disclosed should not be limited by the particular disclosed embodiments described above.

What is claimed is:

1. A modular accessory system for a communication device, the module accessory system comprising:
    a clip-on adapter;
    a case configured to be removably attachable to a communication device, the case comprising a slot on an external surface of the case that is spaced from the lateral edges of the case, the clip-on adapter being separate from the case for the communication device and being configured to be removably attachable to the case for the communication device by inserting a portion of the clip-on adapter into the slot of the case for the communication device,
    the clip-on adapter comprising:
        a first member comprising a hook configured to be securely coupled to the case by inserting the hook under an edge of the slot of the case and a second member comprising an edge configured to contact a portion of the case such that the clip-on adapter is configured to be moved between a first position in which the clip-on adapter is not attached to the case and a second position in which the clip-on adapter is attached to the case by securing a portion of the clip-on adapter between two regions of the case; and
        a mount for attaching at least a flash, tripod, battery, diffuser, microphone, or speaker to the clip-on adapter, such that when the clip-on adapter is in the second position, the flash, tripod, battery, diffuser, microphone, or speaker is also secured to the case.

2. The modular accessory system of claim 1, wherein the first member and the second member are configured to move with respect to each other.

3. The modular accessory system of claim 2, wherein the first member and the second member are configured to rotate with respect to each other.

4. The modular accessory system of claim 2, further comprising a securing lever.

5. The modular accessory system of claim 1, wherein when the clip-on adapter is moved from the first position to the second position, the first member moves with respect to the second member.

6. The modular accessory system of claim 1, wherein the clip-on adapter is configured to be positioned on a top of the case.

7. The modular accessory system of claim 1, wherein the clip-on adapter is configured to be positioned on a side of the case.

8. The modular accessory system of claim 1, wherein the clip-on adapter is configured to be positioned on a bottom of the case.

9. The modular accessory system of claim 1 in which multiple clip-on adapters are attachable to one or more edges on the case.

* * * * *